United States Patent [19]

Kondo

[11] Patent Number: 4,726,506
[45] Date of Patent: Feb. 23, 1988

[54] SOLDERING APPARATUS

[75] Inventor: Kenshi Kondo, Tokyo, Japan

[73] Assignee: Nihon Den-Netsu Keiki Co. Ltd., Tokyo, Japan

[21] Appl. No.: 886,378

[22] Filed: Jul. 17, 1986

[30] Foreign Application Priority Data

Jul. 24, 1985 [JP] Japan .................................. 60-162021

[51] Int. Cl.⁴ .......................... H05K 3/34; B23K 1/00
[52] U.S. Cl. ..................................... 228/37; 228/180.1
[58] Field of Search .................... 228/37, 180.1, 180.2, 228/232, 242; 219/401; 165/104.22, 104.25

[56] References Cited

U.S. PATENT DOCUMENTS

| | | | |
|---|---|---|---|
| 3,291,030 | 12/1966 | Arnold | 219/401 |
| 3,866,307 | 2/1975 | Pfahl et al. | 228/37 |
| 3,904,102 | 9/1975 | Chu et al. | 228/180.1 |
| 4,115,601 | 9/1978 | Ammann et al. | 228/180.1 |
| 4,315,042 | 2/1982 | Spigarelli | 228/37 |
| 4,392,049 | 7/1983 | Bentley et al. | 165/104.25 |
| 4,538,757 | 9/1985 | Bertiger | 228/37 |

OTHER PUBLICATIONS

IBM Bulletin, Technical Disclosure Bulletin, vol. 22, No. 5, Oct. 1979, p. 1833, Soldering Tool Employing Hot Vapors.

Primary Examiner—M. Jordan
Attorney, Agent, or Firm—Stephen F. K. Yee

[57] ABSTRACT

A soldering apparatus is disclosed having a first vessel through which printed circuit boards are transferred for soldering by a combination of a solder wave and hot vapors of a heat transfer liquid, a second vessel in which heat transfer liquid is heated and vaporized, a gas feed conduit extending between the first and second vessels and having a pump for feeding the vapors produced in the second vessel to the first vessel, and a liquid recycling conduit extending between the first and second vessels and having a pump for recycling heat transfer liquid formed by the condensation of the vapors and collected in the first vessel to the second vessel.

4 Claims, 8 Drawing Figures

SOLDERING APPARATUS

BACKGROUND OF THE INVENTION

This invention relates generally to a soldering apparatus and, more specifically, to an apparatus for soldering printed circuit boards traveling along a predetermined path with the use of a combination of a molten solder wave and vapors of a heat transfer liquid.

There is known a vapor phase soldering method in which the objects to be soldered are heated to a temperature appropriate for the soldering operation by condensing thereon hot vapors of a heat transfer liquid. U.S. Pat. No. 3,866,307 discloses a vapor phase soldering apparatus employing a solder wave formed within a chamber filled with saturated vapors of a heat transfer liquid. With such an apparatus in which the vaporization of the heat transfer liquid is effected by a heater disposed in the chamber, it is difficult to control the temperature of the solder wave and the generation of the vapors of the heat transfer liquid. Further, the conventional apparatus requires frequent exchange or make up of the heat transfer liquid due to the inclusion of dusts or the like impurities which cause the deterioration of the heat transfer liquid.

The present invention has been made from the consideration of the above-described problems in the conventional soldering apparatus. In accordance with the present invention there is provided an apparatus for soldering printed circuit boards, comprising:

a first closed vessel;

a second closed vessel for containing a heat transfer liquid having heating means for vaporizing the heat transfer liquid within said second vessel;

first conduit means extending between said first and second vessels and provided with a first pump adapted to feed vapors of the heat transfer liquid in said second vessel to said first vessel through said first conduit means;

second conduit means extending between said first and second vessels and provided with a second pump to recycle heat transfer liquid collected in said first vessel to said second vessel;

entrance and exit ports provided in the first vessel;

conveying means adapted to support printed circuit boards thereon and to convey same along a predetermined path extending through said first vessel;

cooling means provided adjacent to said entrance and exit ports for condensing vapors of the heat transfer liquid and preventing same from escaping through said entrance and exit ports from said first vessel; and means for forming a solder wave within said first vessel;

whereby the printed circuit boards supported on said conveying means are introduced through said entrance ports into said first vessel, contacted with the solder wave and discharged through said exit port from said first vessel, with the vapors of the heat transfer liquid being condensed upon contact with the printed circuit boards and collected in said first vessel.

The present invention will now be described in more detail with reference to the accompanying drawings in which:

DESCRIPTION OF THE PREFERRED EMBODIMENT

Figure 1:
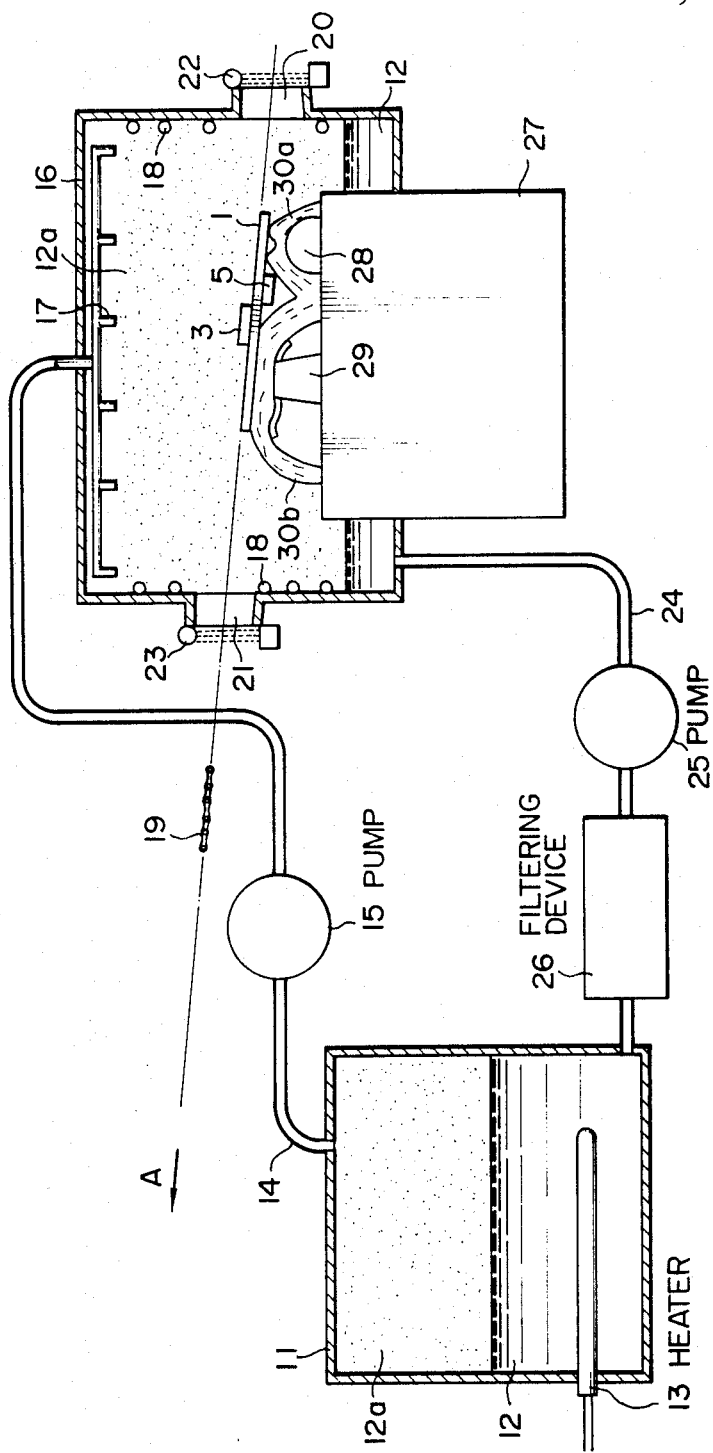
FIG. 1 is an elevational, cross-sectional view diagrammatically showing the soldering apparatus according to the present invention.

Referring now to FIG. 1, designated by the reference numeral 16 is a first closed vessel and 11 is a second closed vessel for containing a heat transfer liquid 12 such as Florinate (trademark of Sumitomo 3M, Inc.). The second vessel 11 is provided with a heater 13 for vaporizing the heat transfer liquid 12 contained therein. The first and second vessels 16 and 11 are interconnected at their upper portions by a first conduit 14 having a pump 15. Thus, the vapors 12a in the space above the liquid level in the second vessel 11 may be fed through the conduit 14 to the first vessel 16 by operation of the pump 15. Preferably, the conduit 14 is connected to a plurality of nozzles 17 so that the vapors of the heat transfer liquid are uniformly distributed in the space within the first vessel 16.

Another conduit, i.e. second conduit 24, also extends between the first and second vessels 16 and 11. The second conduit 24 is connected to lower portions of the vessels 16 and 11 and is provided with a second pump 25. Thus, the heat transfer liquid 12 condensed and collected in the first vessel 16 may be recycled to the second vessel 11 through the conduit 24 by the action of the second pump 25. Preferably inserted in the recycling passage of the heat transfer liquid is a filtering device 26 for the removal of solids contained in the heat transfer liquid flowing through the second conduit 24 before recycling to the second vessel 11.

Disposed within the first vessel 16 is a solder vessel 27 in which a pair of nozzles 28 and 29 are mounted in a tandem fashion to form solder waves 30a and 30b, respectively, within the first vessel 16. Examples of suitable solder waves are shown, for example, U.S. Pat. Nos. 4,465,215 and 4,530,458 both issued to Kondo, the disclosure of which are hereby incorporated by reference. It is to be noted, however, that only a single solder wave may be used for the purpose of the present invention.

The solder which forms the solder waves 30a and 30b has a melting point generally lower than the boiling point of the heat transfer liquid. Preferably the solder has a melting point of 170°-200° C. and the boiling point of 200°-250° C. The solder wave 30b is generally maintained at a temperature of 210°-260° C. with the temperature of the solder wave 30a being the same as or preferably slightly lower than that of the solder wave 30b. It is possible, however, to use a heat transfer liquid having a boiling point lower than the melting point of the solder forming the solder waves 30a and 30b.

The first vessel 16 is provided with entrance and exit ports 20 and 21. Conveying means 19, such as those including conveyor belts or conveyor chains, is provided for supporting printed circuit boards 1 thereon and for conveying same along a predetermined path of travel in a direction shown by the arrow A. The conveying means 19 have a portion extending within the first vessel 16 through the entrance and exit ports 20 and 21 and disposed so that the underside of each printed circuit board 1 supported by the conveying means 19 can be brought into contact with the solder waves 30a and 30b. Preferably, the traveling path within the first vessel 16 is straight and upwardly inclined in the direction of the travel of the printed circuit board 1 so that the underside of the printed circuit board can be brought into contact with the solder waves 30a and 30b in an optimum manner.

Provided adjacent to the entrance and exit ports 20 and 21 are cooling means 18 for cooling and condensing vapors 12a of the heat transfer liquid 12, thereby to prevent the discharge of vapors of the heat transfer liquid from the first vessel 16 through the entrance and exit ports 20 and 21. The cooling means 18 may be, for example, cooling pipes through which a cooling medium is recirculated. Provided adjacent to the outer side of the entrance and exit ports 20 and 21 are means 22 and 23 for forming air curtains which serve to prevent the leakage of vapors of the heat transfer liquid into the atmosphere.

One example of the soldering procedure with the use of the apparatus according to the present invention is now described below with reference to FIG. 1 and FIGS. 2(a) to 2(g). A solder paste 2 having a melting point (e.g. 183.3° C.) which is lower than the boiling point (e.g. 215° C.) of the heat trasfer liquid is applied at predetermined positions on upper surface 1a of the printed circuit board 1 supported on and carried by the conveying means 19 (FIG. 2(a)). A chip part 3 is then temporarily fixed in position on the printed circuit board 1 as shown in FIG. 2(b).

The printed circuit board 1 thus carrying the chip part 3 is then introduced through the entrance port 20 into the first vessel 16 where it contacted with vapors 12a of the heat transfer medium 12 which are produced in the second vessel 11 by means of the heater 13 and which are fed through the conduit 14 and the nozzles 17 to the first vessel 16 by means of the pump 15. Thus, the solder paste 2 is heated and fused by direct contact with the vapors 12a with the simultaneous condensation of the latter. The printed circuit board 1 is discharged from the first vessel 16 through the exit port 21 and the fused solder is cooled and solidified, thereby completing the soldering of the chip part 3 (FIG. 2(c)). The heat transfer liquid formed by condensation of vapors 12a by contact with, for example, the printed circuit board 1 and the cooling means 18 is collected in the bottom of the first vessel 16 and is recycled to the second vessel 11 through the conduit 24 by means of the pump 25. The heat transfer liquid 12 is filtered in the filteration device 26 for the removal of solid impurities and the cleaned liquid is introduced into the second vessel 11.

Figure 2A:
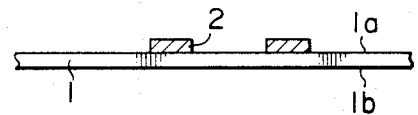
FIGS. 2(a) through 2(g) are diagrammatic views showing a series of soldering operations attainable with the use of the apparatus of the present invention.
Figure 2B:
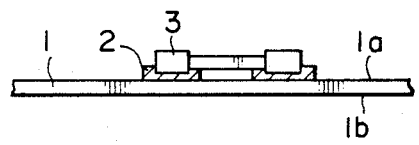
Figure 2C:
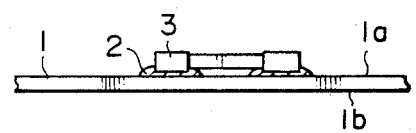
Figure 2D:
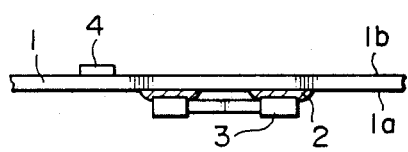
Figure 2E:
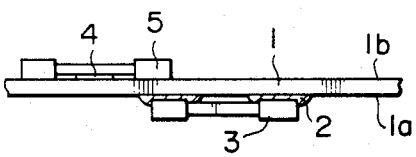

The printed circuit board 1 on which the chip part 3 is firmly soldered is reversed and is then applied with an adhesive 4 on the surface 1b (FIG. 2(d)). Another chip part 5 is mounted on the board 1 in position by means of the adhesive 4 and is heated to effect hardening of the adhesive, so that the chip part 5 is temporarily fixed there (FIG. 2(e)). The printed circuit board 1 is again reversed for mounting an electric part 6 (FIG. 2(f)).

The printed circuit board 1 having the temporarily mounted chip part 5 on the lower side 1b from which the lead wires 7 of the electric part 6 depend is again introduced into the first vessel 16, where it is heated by the vapors of the heat transfer liquid and is applied with molten solder upon contact with the solder waves 30a and 30b (e.g. maintained at 240°–245° C.). The printed circuit board 1 is then discharged from the vessel 16 whereupon the solder 8 is solidified (FIG. 2(g)).

Figure 2F:
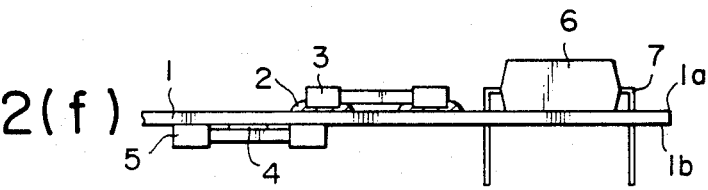
Figure 2G:
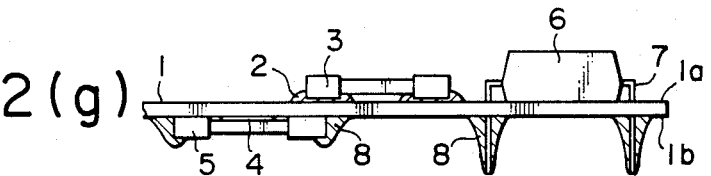

It is to be noted that the steps shown in FIGS. 2(a) and 2(b) may be conducted simulataneously with the step of mounting electric part 6, i.e. the step shown in FIG. 2(f). By this, the soldering of the chip part 3 may be effected simultaneously with the soldering of the chip part 5 and electric part 6. Namely, all the parts mounted on both sides of the printed circuit board may be soldered in only one passage of the printed circuit board 1 through the first vessel 16.

I claim:

1. An apparatus for soldering printed circuit boards, comprising:

a first closed vessel;

a second closed vessel for containing a heat transfer liquid having heating means for vaporizing the heat transfer liquid within said second vessel;

first conduit means extending between said first and second vessels and provided with a first pump adapted to feed vapors of the heat transfer liquid in said second vessel to said first vessel through said first conduit means for heating the printed circuit boards before soldering;

second conduit means extending between said first and second vessels and provided with a second pump to recycle heat transfer liquid collected in said first vessel to said second vessel;

entrance and exit ports provided in the first vessel;

conveying means adapted to support printed circuit boards thereon and to convey same along a predetermined path extending through said first vessel;

cooling means provided adjacent to said entrance and exit ports for condensing vapors of the heat transfer liquid and preventing same from escaping through said entrance and exit ports from said first vessel; and means for forming a solder wave within said first vessel;

whereby the printed circuit boards supported on said conveying means are introduced through said entrance ports into said first vessel, contacted with the solder wave and discharged through said exit port from said first vessel, with the vapors of the heat transfer liquid being condensed upon contact with the printed circuit boards and collected in said first vessel.

2. An apparatus as claimed in claim 1, further comprising filtering means provided in the second conduit means for filtering off solid matters entrained in the heat transfer liquid flowing through the second conduit means.

3. An apparatus as claimed in claim 1, further comprising means provided outside of the first vessel and adjacent to said entrance and exit ports for forming air curtains for preventing vapors of the heat transfer liquid from escaping in the atmosphere.

4. An apparatus as claimed in claim 1, wherein said predetermined path of travel of the printed circuit boards is straight within the first vessel and is inclined upward in the direction of the travel of the printed circuit boards to permit optimum contact between the boards and the solder wave.

* * * * *